United States Patent Office 3,064,034
Patented Nov. 13, 1962

3,064,034
PROCESS FOR THE PREPARATION OF
p-CYANOSTYRENE
Frank J. Kreysa, Bethesda, Md., assignor to W. R. Grace
& Co., New York, N.Y., a corporation of Connecticut
No Drawing. Filed Mar. 17, 1960, Ser. No. 15,559
5 Claims. (Cl. 260—465)

This invention relates to a novel process for the preparation of p-cyanostyrene. In one specific embodiment it relates to the preparation of p-cyanostyrene by the direct reaction of styrene with hydrogen cyanide at an elevated temperature.

The compound p-cyanostyrene is of great interest as a starting material in the preparation of certain polymers. This material has not been widely used as a starting material because there has been no convenient and economically attractive process for its synthesis. The compound has been prepared by the dehydration of methyl (p-cyanophenyl)carbinol. This carbinol was prepared by the Meerwein-Ponndorf reduction of p-cyanoacetophenone which in turn was made by the action of cuprous cyanide on diazotized p-aminoacetophenone. The versatility of p-cyanostyrene as a polymer constituent has been demonstrated by preparing several polymers and copolymers containing the compound.

I have found that p-cyanostyrene can be prepared by the direct interaction of hydrogen cyanide and styrene in a high temperature reaction. The components react in the vapor phase by a process which lends itself to recycling the unreacted components to effect an improved overall yield of the p-cyanostyrene. In the process of my invention, gaseous hydrogen cyanide reacted with styrene in the gaseous phase in a tube reactor heated in an electric furnace. The products are collected in suitable receivers and Dry Ice traps. The p-cyanostyrene product is formed, probably in conjunction with other isomers, in conversion rates in the order of several percent per pass. Acrylonitrile, benzene and benzonitrile are by-products of the reaction and are formed in significant quantities. Thus the reaction is best illustrated by the equation:

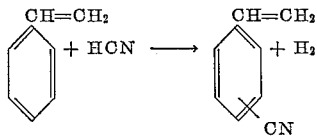

As can be seen from this equation, 1 mole of hydrogen is evolved for every mole of cyanostyrene produced.

The essential requirements for the preparation of p-cyanostyrene according to the process of my invention are high temperature and an adequate flow of the reactants through the system. A catalyst may or may not be used. I have used chlorine gas in some of the runs but styrene will react with hydrogen cyanide without such a catalyst. The reaction may proceed because of the production of cyanogen $(CN)_2$. The cyanogen may remove hydrogen radicals from the styrene thus:

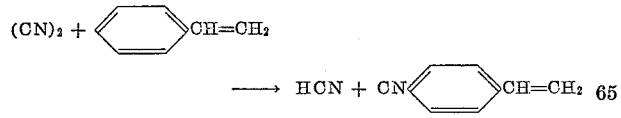

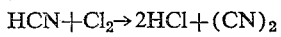

If this is the mechanism of the reaction, the chlorine gas could catalyze the reaction by aiding in the formation of cyanogen according to the equation:

$$HCN + Cl_2 \rightarrow 2HCl + (CN)_2$$

However, the reaction will also proceed satisfactorily in the absence of a catalyst. The chlorine catalyst, when used, should be present in amounts in the range of 2 to 20% of the amount of hydrogen cyanide present in the reactor. In the chlorine catalyzed reactions, the addition of as much as 20% chlorine gas with the hydrogen cyanide gave satisfactory results. In order to obtain a good yield of p-cyanostyrene, our process must be carried out at elevated temperatures. I have found that the reaction goes satisfactorily at temperatures of about 600 to about 1000° C. The preferred temperature is 650 to 850° C. The especially preferred temperature is 700° C.

In the process of my invention the reactants are added to the empty reactor and are mixed with the gaseous catalyst, if one is used. The styrene is introduced by means of a metering pump to the heated reactor. Suitable yields can be obtained by the addition of reactants in the range of 1 mole of styrene to about 5–10 moles of hydrogen cyanide.

In general, the nominal residence time of the reactants at the selected reaction conditions should be for a period of not more than twenty seconds, preferably about 0.2 second to 20 seconds. Residence times of about 0.5 to 5 seconds are preferred.

"Nominal residence time" is the calculated length of time during which the reaction mixture would be in the reaction zone if the number of moles of product mixture were equal to the number of moles feed mixture.

The pressure is not critical but for reasons of economy and ease of operation, I prefer to carry out the operation at atmospheric pressure. However, the process may be carried out at various pressures from sub-atmosphere to super-atmosphere in the vapor phase. Pressures as high as 500 to 1000 pounds per square inch can be employed where high pressure operation is desirable.

The liquid products were analyzed using gas liquid partition chromatography. In this analytical technique the mixture to be analyzed is passed through a heated column containing didecyl phthalate on fire brick. In the apparatus used in these analyses the column was 4 meters long and was heated to 200° C. The process depends on the fact that organic materials boiling at different temperatures are adsorbed and desorbed at different rates. In operation of the column the liquids to be analyzed are vaporized and swept through the column with a sweep gas. A suitable thermal conductance measuring device which actuates a recorder detects changes in the thermal conductivity of the gas which are proportional to the amounts of the organic material being eluted from the column in the gas. The chromatograph is a plot of several peaks divided by traces of the pen at the time that no material was being eluted. The materials are identified by running a blank on the column using the materials to be separated and determining the positions of the peaks. The amounts are calculated by determining the area under each of the peaks with a planograph and computing the proportional amount of each component on the basis of these determinations.

Gas liquid partition chromatography gave satisfactory results for the low boiling products. The combination of gas liquid partition chromatography with infra-red analysis was used to determine the p-cyanostyrene product.

My invention is further illustrated by the following specific but non-limiting examples.

*Example I*

A run was completed in which styrene reacted with hydrogen cyanide in the presence of chlorine gas.

The equipment used to perform these runs was a specially designed Vycor reactor, consisting of a hydrogen cyanide source, a styrene source, a reactor in an electric furnace, various receiving equipment and traps.

In a typical run approximately 500 to 1000 ml. of liquid hydrogen cyanide was placed in a stainless steel tank equipped with a stainless steel cross connection, a pressure gauge, a safety disc and a shut-off valve. This tank was connected through a heated stainless steel line to a metering valve and a flow meter and then into the reactor. The sytrene was metered into the reactor through a metering pump. The reactor was a Vycor tube having a capacity of 275 ml. It was approximately one inch in diameter with an axial thermocouple well. Approximately one third of the distance from the top of the reactor the tube diameter was reduced to give a two region effect so that there was a preheated zone and a reaction zone in the Vycor tube. The bottom of the tube was connected through a condenser to a receiver. The receiver was equipped with an exit line which emptied through two Dry Ice traps to the atmosphere.

In this run 65 g. (0.625 mole) of styrene and 100 g. (3.7 moles) of hydrogen cyanide and 10 g. (0.14 mole) of chlorine were introduced into the reactor. The styrene was introduced at a rate of 1.1 ml. per minute and the hydrogen cyanide and chlorine gas were introduced together in the gaseous phase at approximately 1.22 g. per minute. The temperature in the preheater zone of the reactor was 650–670° C. The temperature in the reaction zone was 840 plus or minus 5° C. The run was continued for a period of 90 minutes. During the run the gaseous effluent was passed through a series of traps to recover the excess hydrogen cyanide. After the reaction was complete, the reactor was flushed with nitrogen gas. The product was removed from the product collection vessel and the traps and transferred to a Nester spinning band column. The hydrogen cyanide was removed at atmospheric pressure. The styrene distilled next at 46° C. at a pressure of about 20 mm. of mercury. As the distillation progressed, the fraction boiling at 55–57° C. at a pressure of 0.5 mm. of mercury was collected and analyzed by infra-red and gas liquid partition chromatography techniques. The analysis of the whole pyrolysate showed this product contained about 1% p-cyanostyrene, 27.4% benzonitrile, 31.3% unreacted styrene, 17.7% benzene and 2.1% acrylonitrile.

This run shows that p-cyanostyrene can be prepared in a yield of at least 1% per pass using chlorine gas as a catalyst.

*Example II*

Another run was completed using the equipment described in Example I.

In this run the equipment and conditions were exactly the same as set out in Example I. The reactor temperature was maintained at 840° C. The styrene, 110 g., was introduced into the reactor at the rate of 1.1 ml. per minute. A mixed charge of 200 g. of hydrogen cyanide and 44 g. of chlorine was added as a gas over a period of 110 minutes. As the reaction progressed, the gaseous materials removed from the reactor were condensed in Dry Ice baths. At the conclusion of the run the product was freed from excess hydrogen cyanide by atmospheric pressure distillation using the technique described in Example I and the remainder fractionally distilled at diminished pressure by means of a Nester spinning band column. The distillates were analyzed by gas liquid partition chromatography methods and found to contain acrylonitrile, benzene and benzonitrile. The fraction boiling between 55 and 57° C. at 0.5 millimeter of mercury contained sufficient p-cyanostyrene to account for a conversion per pass of about 1 to 2%.

*Example III*

Another run was completed in which hydrogen cyanide and styrene were reacted in a high temperature reactor. The equipment and conditions were the same as set out in Example I.

In this run 45 g. of styrene was added to the reactor at the rate of 1.1 ml. per minute, 40 g. of hydrogen cyanide and 9 g. of chlorine gas were added as gases during the run. The reactor was brought to a temperature of about 730 to 735° C. and reaction at this temperature continued for a period of 60 minutes. The gaseous effluents were collected in cooled traps. At the end of the run the products were separated and analyzed after being distilled using the technique set out in Example I. The product analysis by gas liquid partition chromatography showed that a yield of about 5% cyanostyrene was produced during the run. The balance of the product included 75% unreacted styrene, 2.7% benzonitrile and 2% benzene.

It is apparent from these data that the process can be operated to yield p-cyanostyrene in yields of several percent per pass.

*Example IV*

A run was completed in which p-cyanostyrene was prepared from the hydrogen cyanide styrene reaction without the use of chlorine catalyst. The equipment and conditions were the same as set out in Example I.

In this run 184 grams of styrene and 181 grams of hydrogen cyanide were added to a reactor maintained at 840° C. The reactants were added to the reactor over a period of 4 hours and 15 minutes. The styrene was delivered at a rate of 0.8 ml. per minute and the hydrogen cyanide was delivered at the rate of 710 mg. per minute. The product was condensed and collected in a suitable vessel and cooled in an ice bath. The products were separated as before and distilled in a Nester spinning band column. The fraction boiling between 55 and 57° C. at a pressure of 0.5 millimeter of mercury amounted to 2 grams. This is the fraction that contains the p-cyanostyrene product.

It is apparent from these data that p-cyanostyrene can be prepared by the direct reaction of hydrogen cyanide without the use of a catalyst.

Obviously many modifications and variations of the invention as hereinabove set forth may be made without departing from the essence and scope thereof and only such limitations should be applied as are indicated in the appended claims.

What is claimed is:

1. The method of preparing p-cyanostyrene and acrylonitrile which comprises reacting styrene with hydrogen cyanide in the ratio of 1 mole of styrene to about 5–10 moles of hydrogen cyanide at a temperature of about 600–1000° C. for a period of not more than 20 seconds, collecting the liquid product and separating the p-cyanostyrene and acrylonitrile from the other products by vacuum distillation.

2. The method of preparing p-cyanostyrene and acrylonitrile which comprises reacting styrene with hydrogen cyanide in the ratio of 1 mole of styrene to about 5–10 moles of hydrogen cyanide in the presence of a small amount of chlorine gas as a catalyst at a temperature of about 600–1000° C. for a period of not more than 20 seconds, collecting the liquid formed and separating the p-cyanostyrene and acrylonitrile in about 1 to 2 percentile ratio from the other products by vacuum distillation.

3. The method of preparing p-cyanostyrene and acrylonitrile which comprises reacting styrene with hydrogen cyanide in the ratio of 1 mole of styrene to about 5 moles of hydrogen cyanide in the presence of a small amount of chlorine gas as a catalyst at a temperature of about 650–800° C. for about 0.5 to 5 seconds, collecting the liquid formed and separating the p-cyanostyrene and acrylonitrile in about 1 to 2 percentile ratio from the other products by vacuum distillation.

4. The method of preparing p-cyanostyrene and acrylonitrile which comprises reacting styrent with hydrogen cyanide in the ratio of 1 mole of styrene to about 5 moles of hydrogen cyanide at a temperature of about 700° C. for about 0.5 to 5 seconds, collecting the liquid formed and separating the p-cyanostyrene and acrylonitrile in about 1 to 2 percentile ratio from the other products formed by vacuum distillation.

5. The method of preparing p-cyanostyrene and acrylonitrile which comprises reacting styrene with hydrogen cyanide in the ratio of 1 mole of styrene to about 5 moles of hydrogen cyanide in the presence of a small amount of chlorine gas as a catalyst at a temperature of about 700° C. for about 0.5 to 5 seconds, collecting the liquid formed and separating the p-cyanostyrene and acrylonitrile in about 1 to 2 percentile ratio from the other products formed by vacuum distillation.

References Cited in the file of this patent
UNITED STATES PATENTS

| | | |
|---|---|---|
| 2,449,643 | Cosby | Sept. 21, 1948 |
| 2,872,475 | Gaumer | Feb. 3, 1959 |